(12) United States Patent
Takahashi et al.

(10) Patent No.: US 9,250,506 B2
(45) Date of Patent: Feb. 2, 2016

(54) ILLUMINATION LIGHT SOURCE DEVICE AND PROJECTOR PROVIDED WITH THE SAME, AND CONTROL METHOD OF THE PROJECTOR

(71) Applicants: Tatsuya Takahashi, Shinagawa-ku (JP); Kazuhiro Fujita, Machida (JP)

(72) Inventors: Tatsuya Takahashi, Shinagawa-ku (JP); Kazuhiro Fujita, Machida (JP)

(73) Assignee: RICOH COMPANY, LTD., Tokyo (JP)

( * ) Notice: Subject to any disclaimer, the term of this patent is extended or adjusted under 35 U.S.C. 154(b) by 217 days.

(21) Appl. No.: 14/011,937

(22) Filed: Aug. 28, 2013

(65) Prior Publication Data

US 2014/0071182 A1    Mar. 13, 2014

(30) Foreign Application Priority Data

Sep. 10, 2012  (JP) ................................. 2012-198147
Jan. 8, 2013   (JP) ................................. 2013-000938

(51) Int. Cl.
| G03B 21/20 | (2006.01) |
| F21V 9/08 | (2006.01) |
| G02B 27/10 | (2006.01) |
| G03B 33/08 | (2006.01) |

(52) U.S. Cl.
CPC ............... *G03B 21/204* (2013.01); *F21V 9/08* (2013.01); *G02B 27/10* (2013.01); *G03B 21/2066* (2013.01); *G03B 33/08* (2013.01)

(58) Field of Classification Search
CPC .. G03B 21/204; G03B 21/28; G03B 21/2066; G03B 27/10; G03B 33/12; F21V 9/08; H04N 9/316; H04N 9/3161; G09G 5/10; G09G 3/3413; G09G 3/3406; G09G 2320/0233

USPC ................. 353/31, 33, 34, 37, 121; 345/690; 362/84, 231, 243, 246, 259–260, 341, 362/355

See application file for complete search history.

(56) References Cited

U.S. PATENT DOCUMENTS

| 2008/0259286 A1* | 10/2008 | Suzuki et al. .................... 353/31 |
| 2010/0328625 A1 | 12/2010 | Miyazaki et al. |
| 2011/0051102 A1 | 3/2011 | Ogura et al. |
| 2011/0317131 A1 | 12/2011 | Miyazaki |
| 2012/0026472 A1 | 2/2012 | Masuda |
| 2012/0051044 A1 | 3/2012 | Akiyama |

(Continued)

FOREIGN PATENT DOCUMENTS

| CN | 103062672 A | 4/2013 |
| CN | 103376634 | 10/2013 |
| CN | 103376634 A | 10/2013 |
| EP | 2 544 048 A1 | 1/2013 |
| JP | 2010-085745 | 4/2010 |
| JP | 2011-013316 | 1/2011 |
| JP | 2012-008409 | 1/2012 |
| JP | 2012-032634 | 2/2012 |
| JP | 2012-047996 | 3/2012 |
| JP | 2013-65414 A | 4/2013 |
| JP | 2013-076968 | 4/2013 |

OTHER PUBLICATIONS

Combined Chinese Office Action and Search Report issued Mar. 30, 2015 in Patent Application No. 201310409308.7 (with English language translation).

*Primary Examiner* — Hong Zhou
(74) *Attorney, Agent, or Firm* — Oblon, McClelland, Maier & Neustadt, L.L.P.

(57) ABSTRACT

An illumination light source device, comprising: a light path junction member which splits light emitted from a light source into a first light path emitting excitation light for phosphor and a second light path irradiating illumination light; a first diffuser disposed in the first light path; and a second diffuser disposed in the second light path, the second diffuser having a diffusion degree larger than that of the first diffuser.

18 Claims, 14 Drawing Sheets

(56) References Cited

U.S. PATENT DOCUMENTS

| | | | |
|---|---|---|---|
| 2012/0086917 A1* | 4/2012 | Okuda et al. | 353/38 |
| 2012/0106126 A1* | 5/2012 | Nojima et al. | 362/84 |
| 2013/0010264 A1 | 1/2013 | Takahashi et al. | |
| 2013/0021587 A1 | 1/2013 | Miyazaki et al. | |
| 2013/0070205 A1* | 3/2013 | Pan et al. | 353/31 |
| 2013/0077055 A1* | 3/2013 | Wang et al. | 353/31 |
| 2013/0100423 A1 | 4/2013 | Yamagishi et al. | |

* cited by examiner

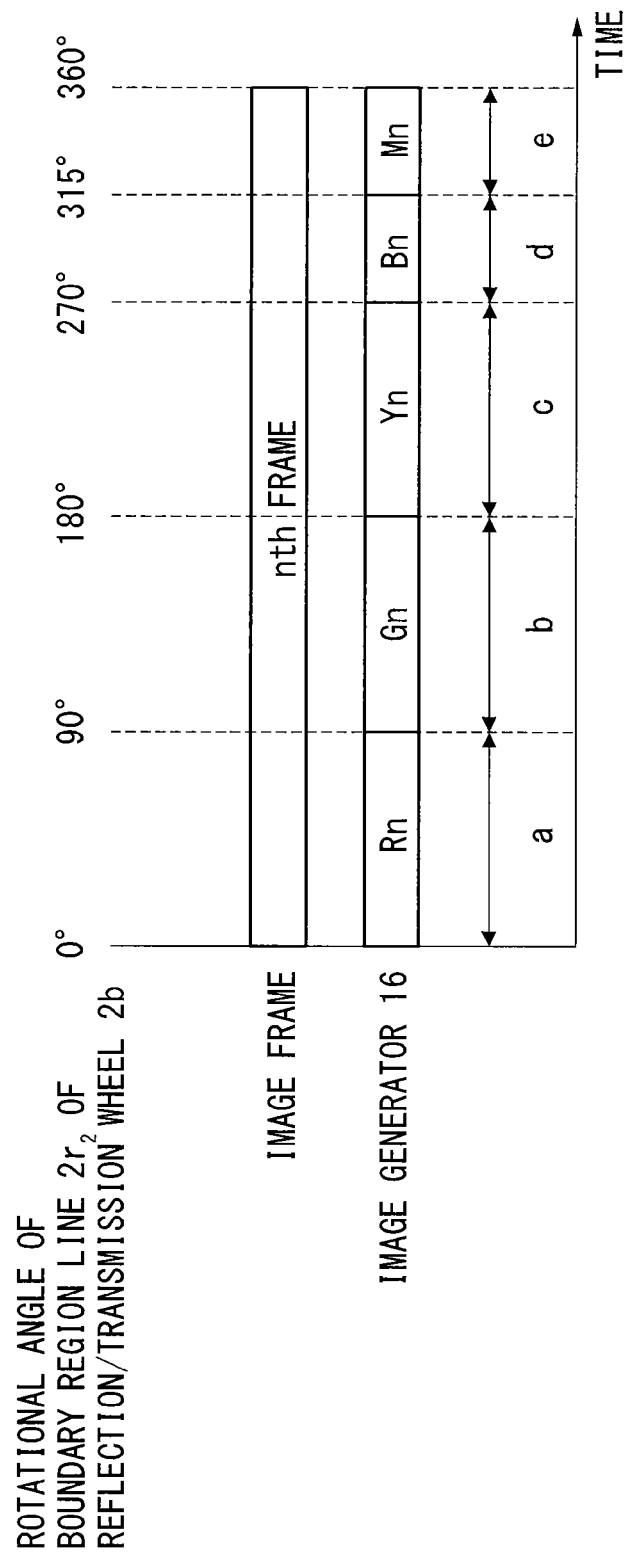

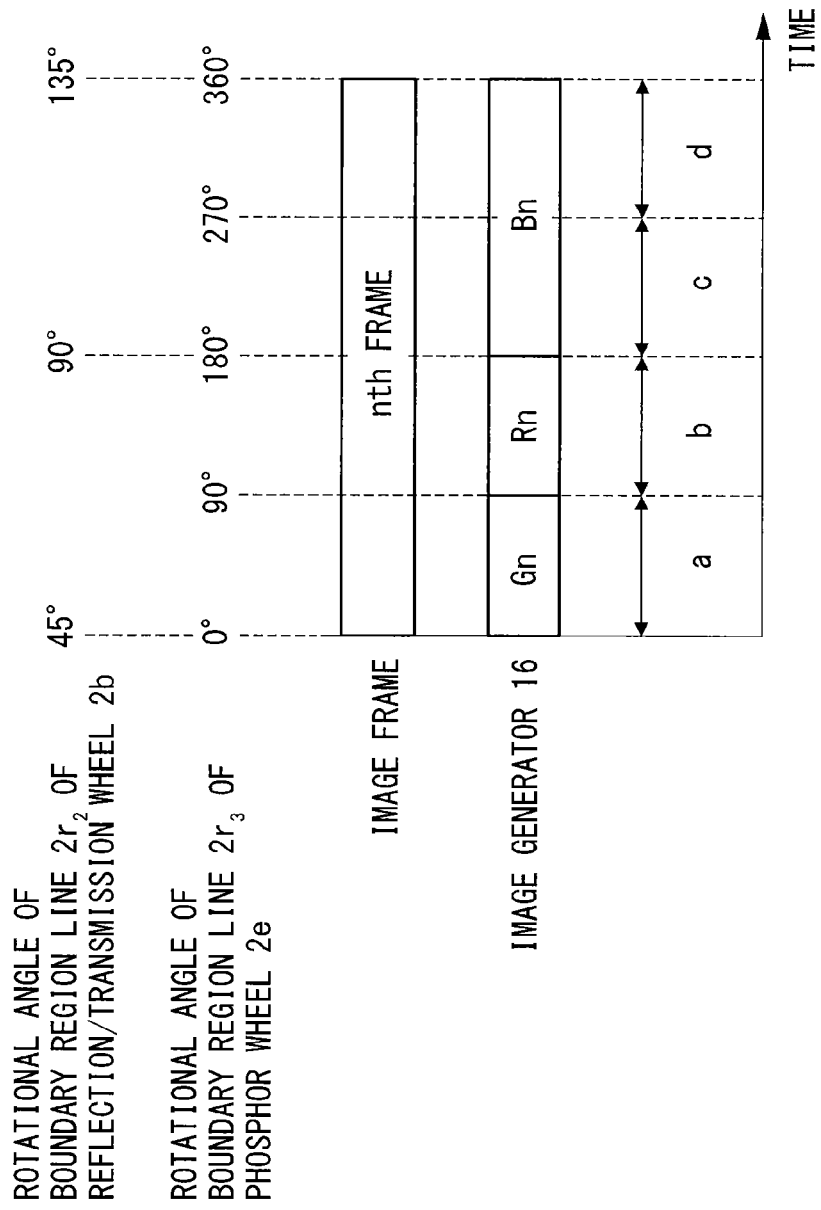

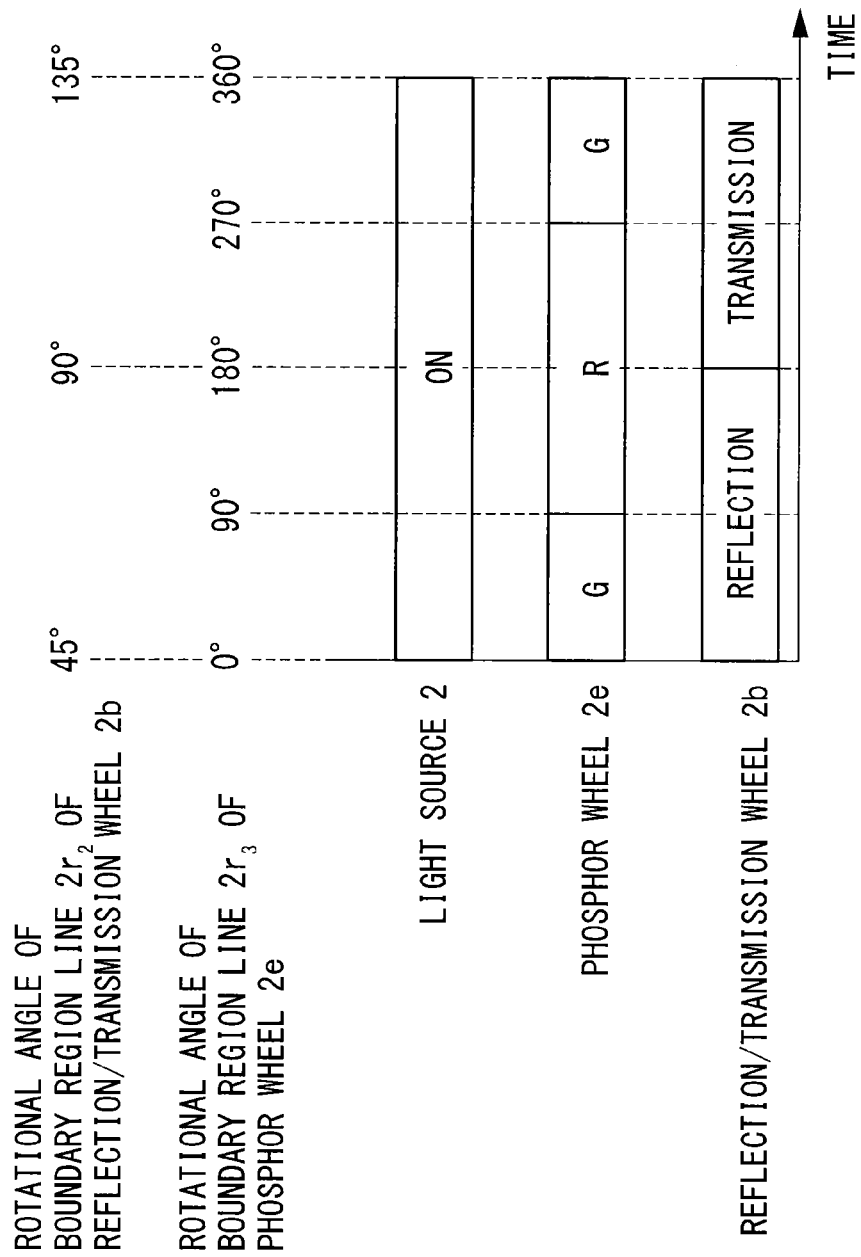

ILLUMINATION LIGHT SOURCE DEVICE AND PROJECTOR PROVIDED WITH THE SAME, AND CONTROL METHOD OF THE PROJECTOR

CROSS-REFERENCE TO THE RELATED APPLICATIONS

The present application is based on and claims priority from each of Japanese Patent Application No. 2012-198147, filed on Sep. 10, 2012, and Japanese Patent Application No. 2013-000938, filed on Jan. 8, 2013, the disclosures of which are hereby incorporated by reference in their entirety.

BACKGROUND OF THE INVENTION

1. Field of the Invention

The present invention relates to an improvement of an illumination light source device and a projector provided with the illumination light source device, and a control method of the projector.

2. Description of the Related Art

For instance, for use at a conference and so on, an illumination light source device for a projector for projecting screen information of a personal computer (hereinafter referred to as "PC") and so on, which has a high luminance discharge lamp (for instance, a super high-pressure mercury lamp) as a light source, is known.

The discharge lamp provides high brightness at low cost, on the other hand, it requires a specific time to emit light steadily after being turned on.

Therefore, it is proposed to put into use a solid-state light-emitting element such as a Red (R), Green (G) or Blue (B) light-emitting diode or an organic EL device as an alternative light source to the discharge lamp.

By applying the solid-state light-emitting device as an illumination light source of a projector, the projector can be started at high speed. At the same time, environmental concerns can be minimized.

As the illumination light source device using the solid-state light-emitting element, for example, an art for projecting a color image is known (for example, refer to JP2011-13316A). The color image projecting technique is such that using a blue laser diode as a first light source and irradiating laser beam emitted from the blue laser diode as excitation light to phosphor. By exciting the phosphor, each RGB colored light is generated. The each RGB colored light is modulated by a liquid crystal light modulation element and so on in every pixel, and then accomplishes color image projection.

The illumination light source device described in JP2011-13316A as mentioned above includes a solid-state light source group having a plurality of solid-state light-emitting sources, a light-condensing optical system which concentrates light from the solid-state light-emitting source group, a collimator optical system which collimates most of light from the light-condensing optical system, a lens integrator which makes uniform an in-plane light intensity distribution of light from the collimator optical system, and a transmission/diffusion optical component which diffuses and transmits light from the light-condensing optical system, disposed adjacent to a condensing position where the light is concentrated by the light-condensing optical system.

In accordance with the illumination light source device described in JP2011-13316A, because macular light can be incident on a lens integrated optical system after being diffused, high luminance illumination light can be obtained and an efficiency of light utilization is enhanced. Therefore, illumination light having even and stable luminous intensity can be obtained.

An illumination light source device is also known (for example, refer to JP2010-85745A). The illumination light source device includes a fluorescent plate having a fluorescent light-emitting part and a transmission/diffusion part, a first light source emitting light of a particular wavelength bandwidth capable of exciting phosphor, and a second light source emitting fluorescent light from the fluorescent plate and the light having a different wavelength bandwidth from the fluorescent light emitted from the fluorescent plate and the light emitted from the first light source. The illumination light source device further includes a light-guiding system which guides the light of each wavelength bandwidth emitted from the fluorescent plate, and a light source-controlling part which controls lighting-up of the first and second light sources respectively.

According to the disclosures of JP2011-13316A and JP2010-85745A, unevenness of brightness (unevenness in luminous intensity) of light used for illumination light to a screen can be reduced. However, due to the configuration that the excitation light is irradiated directly to the phosphor of a phosphor wheel, the irradiation time per one unit (one second) to the phosphor is fixed regardless of a rotation number of the phosphor per one unit of time (one second), so that there is still the possibility of degradation of fluorescent property of the phosphor if excitation light is continuously irradiated to a micro area of the phosphor.

On the other hand, in order to prevent unevenness of brightness of the light which irradiates a screen and unevenness of the brightness (unevenness in luminous intensity) of fluorescent light, it is considered that the light irradiated from the light source is split into a light path used for exciting the phosphor and a light path used for irradiating a screen, and diffusion members are disposed in both light paths. However, if such a construction is simply adopted, there is a disadvantage in that the loss of light intensity of the light emitted from the light source used for excitation of the fluorescent light is large. That is, the efficiency of the fluorescent light is lowered.

In this regard, a light source device having only one diffuser member disposed in the light path used for irradiation to a screen can be considered. However, if such, the generation efficiency of the fluorescent light is reduced, as a result of which the power density of the light from the light source used for the excitation of the phosphor is too high.

SUMMARY OF THE INVENTION

The present invention is made in view of the circumstances described above. An object of the present invention is to provide an illumination light source device which is capable of lowering unevenness of brightness of the light used for irradiating a screen while avoiding lowering of generation efficiency of fluorescent light generated from phosphor, when light from the light source is used by being split into a light path used for exciting fluorescent light and a light path used for irradiating a screen, a projector incorporated with the illumination light source device, and a control method of the projector.

An illumination light source device according to one embodiment of the present invention includes a light path junction member which splits light emitted from a light source into a first light path emitting excitation light for phosphor and a second light path irradiating illumination light; a first diffuser disposed in the first light path; and a second diffuser disposed in the second light path, the second diffuser having a diffusion degree larger than that of the first diffuser.

BRIEF DESCRIPTION OF THE DRAWINGS

FIG. 6A and FIG. 6B are explanatory views showing an example of a relationship between color of light irradiating the image generator, an on-off timing of each light sources and a rotation angle of the reflection/transmission wheel in the illumination light source device in FIG. 4, in one image frame.

FIG. 8A illustrates a diffusion status of excitation light in which only one transmission/diffuser plate is disposed in a light path where the excitation light from the first illumination optical system does not pass through the phosphor wheel. FIG. 8B illustrates a diffusion status of excitation light in which two transmission/diffuser plates are disposed in a light path where the excitation light from the first illumination optical system does not pass through the phosphor wheel.

FIG. 17A and FIG. 17B are explanatory views showing an example of a relationship between color of light irradiating an image generator of the illumination light source device in FIG. 12, rotation angle positions of the reflection/transmission wheel and the phosphor wheel shown in FIG. 12, in one image frame.

DETAILED DESCRIPTION OF THE PREFERRED EMBODIMENTS

Hereinafter, embodiments of the present invention will be described with reference to the accompanying drawings.

Embodiment 1

Figure 1:
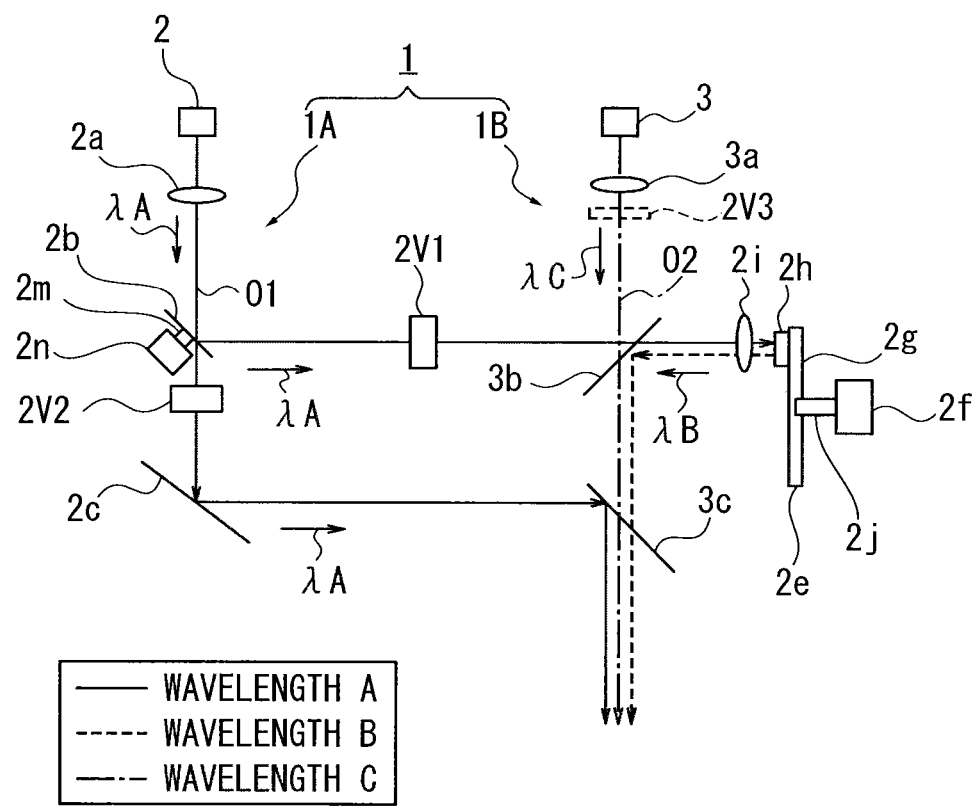
FIG. 1 is an optical view showing an illumination light source device according to Embodiment 1 of the present invention.

FIG. 1 illustrates a first embodiment of an illumination light source device according to the present invention. In FIG. 1, numeral 1 shows an illumination optical system.

Construction of Illumination Optical System 1

The Illumination optical system 1 has two illumination light sources (hereinafter, referred to as light sources) 2 and 3 in the illustrated embodiment. The light source 2 (excitation light source) is included in a first illumination optical system 1A. The light source 3 is included in a second illumination optical system 1B.

The first illumination optical system 1A schematically includes a coupling lens 2a as a first optical element, a reflection/transmission wheel 2b as a reflecting/transmitting member, a total reflection mirror 2c and a phosphor wheel 2e as a phosphor member. Herein, numeral 01 shows an optical axis of the first illumination optical system 1A.

The reflection/transmission wheel 2b is provided in an emitting light path of the light source 2. The emitting light path is split into a transmitting light path and a reflecting light path by a transmission area and a reflection area (will be described later) of the reflection/transmission wheel 2b.

The second illumination optical system 1B schematically includes a coupling lens 3a, a dichroic mirror 3b and a dichroic mirror 3c. The dichroic mirror 3b and the dichroic mirror 3c are also used in the first illumination optical system 1A. Numeral 02 shows an optical axis of the second illumination optical system 1B.

A phosphor wheel 2e is provided on the reflecting light path formed by the reflection area of the reflection/transmission wheel 2b and includes a disc-shaped base 2g and phosphor 2h. A light-condensing element 2i is provided in front of the phosphor wheel 2e.

The light source 2 is a solid-state light-emitting element which emits excitation light having a small wavelength as illumination light. For example, a blue laser diode which generates blue laser light as visible light may be used for the light source 2. Meanwhile, as the light source 2, a light-emitting diode emitting blue light can be used instead of the blue laser diode. Herein, the light source 2 emits light having a wavelength of $\lambda A$ (400 nm<$\lambda A$<450 nm).

The light source 3 is a solid-state light source element which emits illumination light having a longer wavelength $\lambda C$ than that of $\lambda B$. A wavelength range of the wavelength $\lambda C$ is, for example, 620 nm<$\lambda C$<750 nm. The light source 3 emits red light. Each of the light sources 2 and 3 is schematically illustrated per only one for a convenience of description. However, numbers of the light source 2 and the light source 3 are not limited to the above, and a light-emitting array including a plurality of light-emitting diodes may be used as the light sources.

Figure 2:
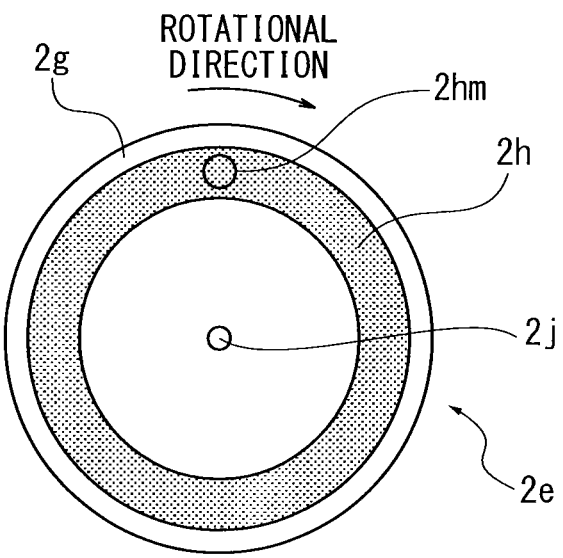
FIG. 2 is an enlarged plan view showing a phosphor wheel in the illumination light source device in FIG. 1.

FIG. 2 illustrates the disc-shaped base 2g of the phosphor wheel 2e as viewed from a side at which the phosphor 2h is formed. The disc-shaped base 2g includes a reflection member. The phosphor 2h is formed in a ring-like shape. The disc-shaped base 2g is rotatably-driven around a rotation axis 2j by a driving part 2f.

Alternatively, for example, a rectangle-shaped base may be used instead of the disc-shaped base 2g. In this case, the phosphor 2h is formed on the rectangle-shaped base 2g, extending in a longitudinal direction of the base. The rectangle-shaped base is periodically reciprocated in perpendicular and longitudinal direction to a light line of the wavelength λA.

The phosphor 2h is excited by the illumination light of the wavelength λA as excitation light and generates a fluorescent light of the wavelength λB. For instance, the wavelength range of the wavelength λB is 495 nm<λB<570 nm, and the phosphor 2h generates green light as illumination light.

The dichroic mirror 3b has an optical characteristic which transmits both light of the wavelengths λA and λC, and reflect light of the wavelength λB. The dichroic mirror 3c has an optical characteristic which reflects light of the wavelength λA and transmits light of the wavelengths of λB and λC.

Figure 3:
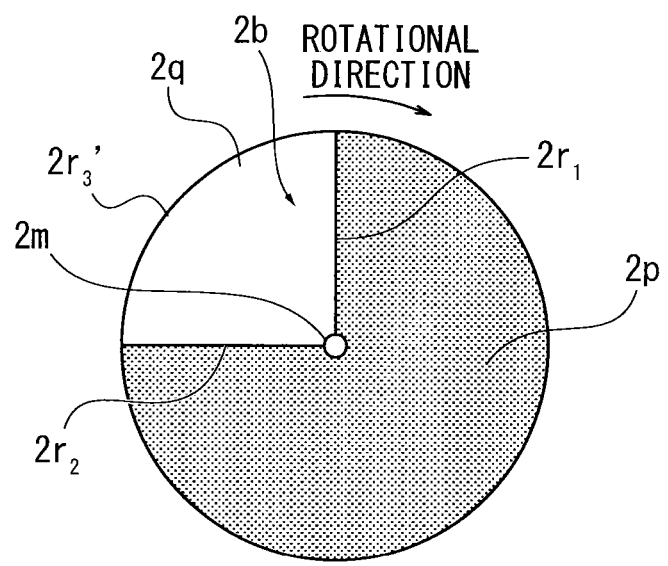
FIG. 3 is an enlarged plan view showing a reflection/transmission wheel in the illumination light source device in FIG. 1.

The reflection/transmission wheel 2b is rotatably-driven around a rotational axis 2m as a center by a driving part 2n. The reflection/transmission wheel 2b has, as shown in FIG. 3, a fan-shaped transmission area 2q surrounded by two boundary region lines $2r_1$ and $2r_2$ for the radial direction and an arc segment line $2r_3'$. An angle range of the transmission area 2q is, for example, 90 degrees. If the transmission area 2q is shaped by a notch, a saving of materials can be achieved.

The area other than the transmission area 2q of the reflection/transmission wheel 2b is a reflection area 2p which totally reflects light of the wavelength λA. Herein, an angle range of the reflection area 2p is 270 degrees. The reflection area 2p functions to reflect light of the wavelength λA totally.

The angle range of the reflection area 2p of the reflection/transmission wheel 2b is stated above as 270 degrees centering on the rotational axis 2m, however, it is not always limited to that angle. The reflection area 2p and the transmission area 2q are switched each other by rotating the reflection/transmission wheel 2b, but they can be switched by reciprocating the wheel as well as the disc-shaped base 2p is reciprocated.

The reflection/transmission wheel 2b is included obliquely to the optical axis 01 of the light path of the first illumination optical system 1A. In Embodiment 1, the reflection/transmission wheel 2b is 45 degrees to the optical axis 01. However, it is not limited to that angle as long as the wheel can switch over the light path of the excitation light of the wavelength λA. In addition, when a diffusion plate is provided in the transmission area 2q of the reflection/transmission wheel 2b, there is an effect that a speckle pattern of laser beam emitted from a laser diode can be controlled.

The reflection/transmission wheel 2b rotates appropriately in synchronization with image data and thereby, the transmitting light path and the reflecting light path of the first illumination optical system 1A are selected according to a color which should be provided by the image data. Herein, for example, the reflection/transmission wheel 2b rotates 30 times per second, and rotates one revolution during one frame (for instance, 1/30 per second).

In the reflecting light path between the reflection/transmission wheel 2b and the dichroic mirror 3b, a transmission/diffuser plate 2v1 is provided as the first transmission/diffuser member (the first diffuser member). The transmission/diffuser plate 2v1 functions to diffuse and transmit the excitation light reflected by the reflection area 2p, and then conduct the light to the phosphor wheel 2e.

Herein, the reflecting light path is a path of the light emitted from the light source 2 used for exciting the phosphor 2h.

In the transmitting light path between the reflection/transmission wheel 2b and the total reflection mirror 2c, a transmission/diffuser plate 2v2 is disposed as a second transmission/diffuser member (second diffuser member). The transmission/diffuser plate 2v2 has a function to diffuse and transmit the excitation light which is transmitted through the transmission area 2q, and conduct it to the dichroic mirror 3c as illumination light.

Herein, the transmitting light path is the path where the light emitted from the light source 2 used for irradiating a not-shown screen.

The reflection/transmission wheel 2b functions as a light path junction member which splits the light emitted from the illumination source 2 into the light path where the light is used for exciting the phosphor 2h and the light path where the light is used for irradiating the screen. Herein, the first diffuser member and the second diffuser member include the transmission/diffuser members, but they are not always limited to the above.

Herein, the reflecting light path is the path where the excitation light passes through the phosphor wheel 2e, and the transmitting light path is the path where the excitation light does not pass through the phosphor wheel 2e. However, it may be possible for the transmitting light path to be the light path where the excitation light passes through the phosphor wheel 2e and for the reflecting light path to be the light path where the excitation light does not pass through the phosphor wheel 2e, by changing optical characteristics of the dichroic mirrors 3b and 3c and the optical arrangement of the phosphor wheel 2e.

The transmission/diffuser plate 2v1 is disposed at farther away from the reflection/transmission wheel 2b, compared with the transmission/diffuser plate 2v2. The reason for that will be described later but a ray path of light line of the wavelengths of λA, λB and λC is described on ahead.

The excitation light of the wavelength λA is emitted from the light source 2 and directed to the reflection/transmission wheel 2b through the coupling lens 2a. If the transmission area 2q of the reflection/transmission wheel 2b is in the emitting light path of the first illumination optical system 1A, the excitation light of the wavelength λA transmits the transmission area 2q and is directed to the transmission/diffuser plate 2v2 disposed in the transmitting light path.

The excitation light which transmitted the transmission area 2q transmits the transmission/diffuser plate 2v2 and is diffused by the plate, directed to the total reflection mirror 2c and the dichroic mirror 3c, and reflected by the dichroic mirror 3c, then finally emitted as illumination light from the illumination optical system 1. Because the illumination light has been diffused by the transmission/diffuser plate 2v2, uniformity of the excitation light emitted from the light source 2 is improved.

When the reflection area 2p of the reflection/transmission wheel 2b is on the emitting light path of the first illumination optical system 1A, the excitation light of the wavelength λA is reflected by the reflection area 2p and is directed to the transmission/diffuser plate 2v1 disposed in the reflecting light path of the first illumination optical system 1A.

The excitation light directed to the transmission/diffuser plate 2v1 transmits the transmission/diffuser plate 2v1, being diffused by it at the same time, and is directed to the dichroic mirror 3b and transmits the same.

The excitation light of the wavelength λA, which transmitted the dichroic mirror 3b is concentrated by the light-condensing element 2i, and irradiates a microscopic area 2hm (refer to FIG. 2) of the phosphor 2h. Then, the microscopic area 2hm of the phosphor 2h is excited and generates fluorescent light of the wavelength λB.

The excitation light of the wavelength λA and the fluorescent light of the wavelength λB are reflected by the disc-shaped base 2g, and concentrated by the light-condensing element 2i, and re-directed to the dichroic mirror 3b. The light of the wavelength λA passes through the dichroic mirror 3b. The light of the wavelength λB is reflected by the dichroic mirror 3b and transmits the dichroic mirror 3c, and then is emitted from the illumination optical system 1 as green-color fluorescent light.

The light of the wavelength λA is, as shown in FIG. 2, irradiated spot-wise to the microscopic area 2hm of the phosphor 2h. In this regard, a generation efficiency of the phosphor 2h can be lowered or a luminescence property can be degraded if the light of the wavelength λA irradiates continuously the same microscopic area 2hm of the phosphor 2h.

However, according to Embodiment 1, the disc-shaped base 2g is always driven rotatably around the rotation axis 2j, and the microscopic area 2hm of the phosphor 2h irradiated by the light of the wavelength λA changes temporally. Therefore, continuous concentration of the energy of the light of the wavelength λA to the same microscopic area 2hm can be avoided and the degradation of the luminescence property of the phosphor 2h can be prevented.

Moreover, by the reflection/transmission wheel 2b, the emitting light path of the excitation light can be switched alternately to the transmitting light path and the reflecting light path, in a unit of time (one second). The emitting time of the excitation light to the phosphor per unit of time can be shortened. Therefore, the degradation of the fluorescent characteristics of the phosphor can be prevented further.

In addition, on account of the transmission/diffuser plate 2v1 is disposed in the light path where the excitation light passes through the phosphor wheel 2e, power concentration of the excitation light can be lowered. As a result, the degradation of the generation efficiency of the fluorescent light caused from that the power density of the excitation light is too high can be avoided and the degradation of the fluorescence property caused from the rotation of the phosphor wheel 2e can be avoided. Further, the degradation of the fluorescence property can also be avoided all the more, by multiple synergy of switching the light paths by the reflection/transmission wheel 2b.

Hereafter, the reason that the transmission/diffuser plate 2v1 is disposed farther away from the reflection/transmission wheel 2b compared with the transmission/diffuser plate 2v2 is described as following.

If the same materials having a same refractive property, configuration and thickness are used for the transmission/diffuser plate 2v1 and the transmission/diffuser plate 2v2, namely if materials having the same diffusion-angle range are disposed, the diffusion degree of the light of the wavelength λA is made to be the same when the transmission/diffuser plate 2v1 and the transmission/diffuser plate 2v2 are arranged to have the same distance from the reflection/transmission wheel 2b.

However, herein, since the fluorescent light of the wavelength λB excited by the light of wavelength λA is scattering light generated by the phosphor 2h, the fluorescent light has better uniformity compared to the light of the wavelength λA, namely the fluorescent light has lower unevenness in light intensity.

In contrast to the above, the light of the wavelength λA emitted from the light source 2 used as the illumination light for a screen is strong light having an intense distribution property derived from the light source 2, and the illumination light has relatively higher unevenness in light intensity than the fluorescent light of the wavelength λB.

Accordingly, in order to avoid a drop in efficiency of generation of fluorescent light because the power density of the light used for exciting the phosphor 2h is too high, the following arrangement can be considered. The distance between the transmission/diffuser plate 2v1 disposed in the light path of the light of the wavelength λA used for exciting the phosphor 2h and the reflection/transmission wheel 2b is set to be the same as that between the transmission/diffuser plate 2v2 disposed in the light path of the light of the wavelength λA used for illuminating the screen and the reflection/transmission wheel 2b. Then, the diffusion degree of the light used for exciting the phosphor 2h is set to be the same as that of the light of the wavelength λA used for irradiating the screen. However, a problem may still occur in that the light intensity of light of the wavelength λA incident on the light-condensing element 2i becomes lower and the light intensity of the fluorescent light of the wavelength λB from the phosphor wheel 2e becomes lower, even if the unevenness of the light intensity of fluorescent light can be lowered.

In other words, there is a problem in that the efficiency of generation of fluorescent light is lowered.

In order to increase the light intensity of the light of the wavelength λA incident on the phosphor wheel 2e, it can be considered to increase a lens diameter of the light-condensing element 2i. However, there is an inconvenience that a whole spectral optical system increases in size if the lens diameter of the light-condensing element 2i is increased.

Therefore, in order to avoid a drop in efficiency of generating fluorescent light derived from that the power density of the light of the wavelength λA is too high, the following arrangement can be considered. The distance between the transmission plate 2v1 disposed in the path of light of the wavelength λA for exciting the phosphor 2h is set to be the same as that between the transmission/diffuser plate 2v2 disposed in the path of light of the wavelength λA for illuminating a screen and the reflection/transmission wheel 2b. However, such arrangement has disadvantages even if the uniformity of the luminescent light of the wavelength λB can be increased.

Thus, in Embodiment 1, the transmission/diffuser plate 2v1 is disposed farther away from the reflection/transmission wheel 2b than the transmission/diffuser plate 2v2, thereby degradation of the generation efficiency of fluorescent light generated from the phosphor 2h can be avoided.

On the contrary, since the transmission/diffuser plate 2v2 is disposed adjacent to the reflection/transmission wheel 2b and away from an integrator described later below, the diffusion degree of the light of the wavelength λA can be ensured. The unevenness of the light intensity, as a result of the light of the wavelength λA being used as it is for illuminating the screen, can be prevented.

The illumination light of the wavelength λC is directed to the dichroic mirror 3b through the coupling lens 3a and transmits the dichroic mirrors 3b and 3c, and then it is emitted as red illumination light from the illumination optical system 1.

The dichroic mirror 3c is a light path-combining element which combines the transmitting light path and the reflecting light path which have been split by the reflection/transmission wheel 2b. It forms a combined light path. Herein, it functions to combine the light path where the excitation light passes through the phosphor wheel 2e, the light path where the excitation light does not pass through the phosphor wheel 2e and the light path of the light of the wavelength λC.

According to Embodiment 1, a distance between the transmission/diffuser plate 2v1 and the reflection/transmission wheel 2b is longer than that between the transmission/diffuser plate 2v2 and the wheel. However, the materials having lower diffusion-angle than that of transmission/diffuser plate 2v2 can be also used for the transmission/diffuser plate 2v1.

In this instance, the illumination light of the wavelength λA having lower unevenness in light intensity can be obtained while avoiding the degradation of the generation efficiency of the fluorescent of the wavelength λB generated from the phosphor 2h. It can be accomplished even if the transmission/diffuser plate 2v1 disposed in the light path of the light of the wavelength λA used for exciting the phosphor 2h and the reflection/transmission wheel 2b have the same distance as between the transmission/diffuser plate 2v2 disposed in the light path of the light of the wavelength λA used for illuminating the screen and the wheel.

Furthermore, in Embodiment 1, the transmission/diffuser plate 2v1 is disposed in the reflecting light path of the first illumination optical system 1A and the transmission/diffuser plate 2v2 is disposed in the transmitting light path of the illumination optical system 1A. However, as shown in the emitting light path of the second illumination optical system 1B with a broken line, a transmission/diffuser plate 2v3 of the third transmission/diffuser member can be disposed. By diffusing the light of the wavelength λA, the fluorescent light of the wavelength λB and the illumination light of the wavelength λC evenly, it is possible to avoid the unevenness of the light intensity of the light used for illuminating the screen.

Embodiment 2

Figure 4:
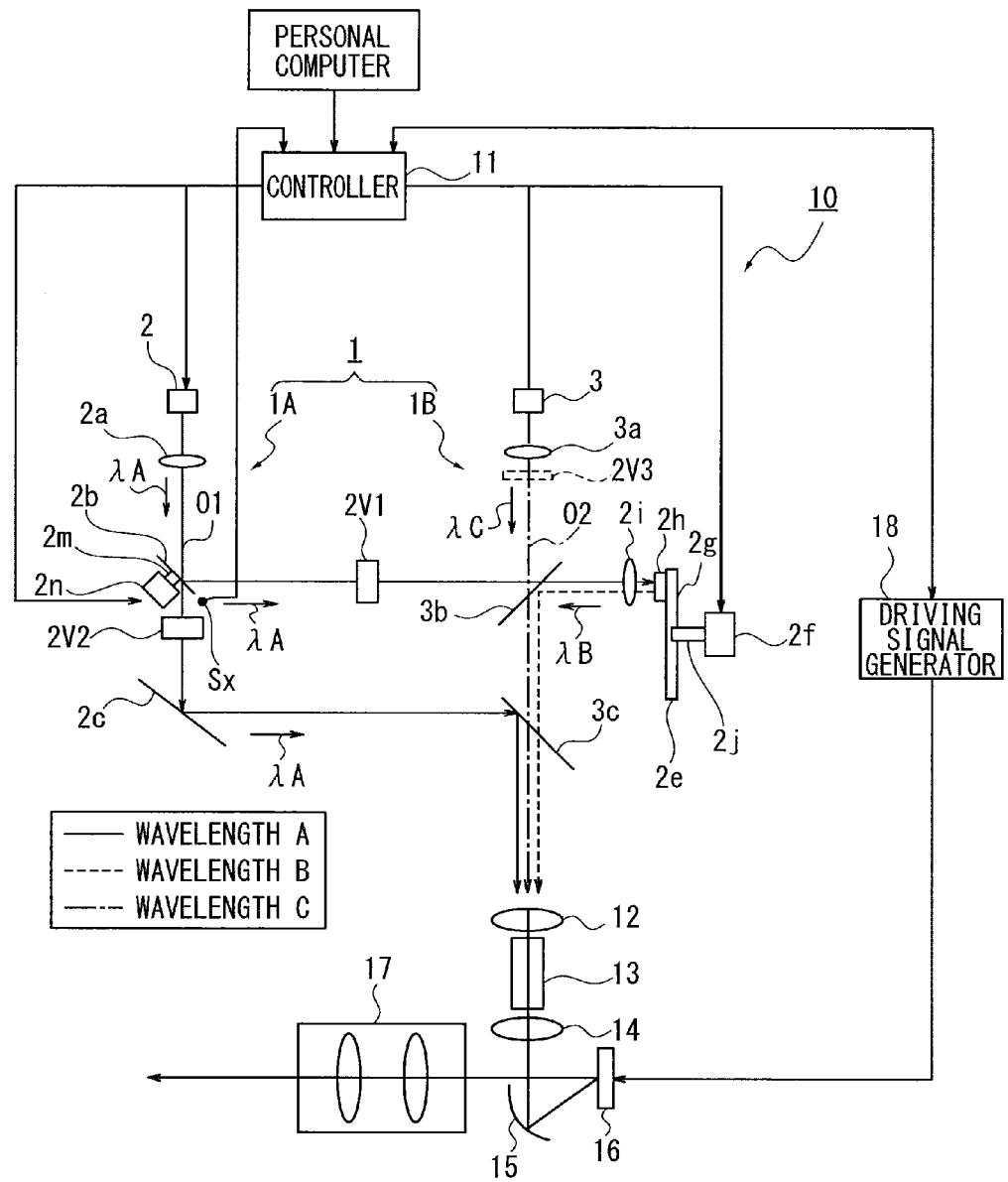
FIG. 4 is an explanatory view of a projector according to Embodiment 2 of the present invention and illustrates an example of a structure of the projector incorporating the illumination light source device in FIG. 1.

FIG. 4 illustrates one example of the structure of a Projector 10 incorporating the illumination optical system 1 of Embodiment 1. In FIG. 4, the same numerals and characters as Embodiment 1 are used to represent the similar constituent, and the detailed description thereof is omitted here.

The projector 10 includes a controller 11 which controls the illumination optical system 1, a light-condensing element 12, an integrator 13, a light-condensing element 14, a reflection mirror 15, an image generator 16 and a projection lens 17. The light-condensing element 12, the integrator 13, the light-condensing element 14 and the reflection mirror 15 are included in an irradiating optical system which directs the illumination light emitted from the dichroic mirror 3c to the image generator 16. The projection lens 17 is included in a projection light system which projects a projection image generated by the image generator. By the projection light system, the projection image is projected and displayed to the not shown screen.

The illumination lights of the wavelengths λA, λB and λC evenly diffused by the transmission/diffuser plates 2v1, 2v2 and 2v3 are concentrated by the light-condensing element 12, and evenly diffused plan-like by the integrator 13. Thereby, the light is irradiated to the image generator 16 through the light-condensing element 14 and the reflection mirror 15 with the condition that unevenness of the light intensity is removed all the more. A construction and an operation of the controller 11 will be described later and a construction and an operation of the image generator 16 are explained on ahead.

(Construction/Operation of Image Generator 16)

An image generation data is input to the image generator 16. The image generator 16 includes, for example, by DMD (Digital Micromirror Device) heretofore known.

The DMD includes a micromirror by pixel. An angle of the micromirror is two-position controlled and by controlling repetition intervals of the two-position control, it permits the gradation control.

Here, during a period of one image frame, each light of R (Red: Wavelength λC), G (Green: Wavelength λB) and B (Blue: Wavelength λA) is turned-on and irradiated according to time order. Synchronized with the irradiation timing of each RGB colored light, the image generator 16 is driven by a micromirror driving signal based on the image generation data per display pixel. Thereby, a full-color image is generated on the basis of image generation data using an afterimage phenomenon of the eyes.

(Construction/Operation of Controller 11)

The controller 11 includes CPU (Central Processing Unit), ROM (Read Only Memory) and RAM (Random Access Memory). The controller 11 totally controls the whole movement of the projector 10 using RAM as a work memory, based on a program that has stored in ROM in advance.

Additionally, the controller 11 includes a not-shown interface to an external information apparatus, and for example, it can scan image data from a personal computer. Then, the controller 11 processes the scanned image data and generates aforesaid image generation data which suits for driving the image generator 16.

The image generation data is input into a driving signal generator 18. The driving signal generator 18 generates a driving signal based on the image generation data. The driving signal is outputted towards the image generator 16.

The controller 11 controls lightning of the light sources 2 and 3, and also controls rotations of the driving parts 2f and 2n. Hereinafter, one embodiment of the control by the controller 11 will be explained with a view to FIG. 5, FIG. 6A and FIG. 6B.

Figure 5:
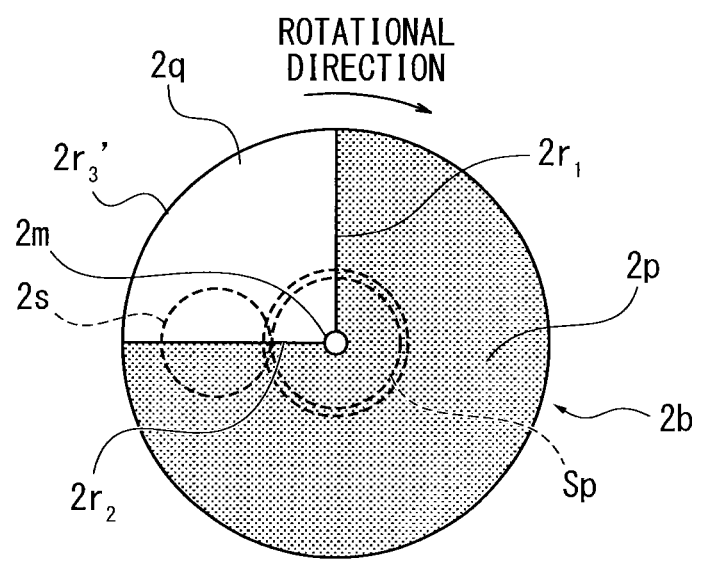
FIG. 5 is an explanatory view which illustrates a relationship between a rotation angle position of the reflection/transmission wheel in FIG. 3 and a light path of light emitted from a light source of the first illumination optical system.

The reflection/transmission wheel 2b rotates, as shown in FIG. 5, around the rotation axis 2m like crossing the emitting light path of the first illumination optical system 1A. In this regard, instead of the emitting light path of the first illumination optical system 1A, the round-shape spot area 2s equivalent to the emitting light path is shown with a broken line. Each of the boundary region lines $2r_1$ and $2r_2$ between the reflection area 2p and the transmission area 2q passes across the spot area 2s per one time while the reflection/transmission wheel 2b rotates one revolution.

On the reflection/transmission wheel 2b, as shown schematically in FIG. 5, a circular-shape rotation angle position-detecting pattern Sp is formed adjacent to the rotation axis 2m to surround the rotation axis 2m.

An image receptor Sx (shown in FIG. 4) which is included as a part of the encoder is provided with the point where it confronts to the rotation angle position-detecting pattern Sp. When the spot area 2s relatively crosses a part of the rotation-angle position-detecting pattern Sp, a detecting pattern while crossing the area is received through the image receptor Sx.

The image receptor Sx and the rotation angle-detecting pattern Sp are included in a rotation angle position-detecting sensor.

The image receptor Sx outputs the receiving signals to CPU. The rotation angle position-detecting pattern Sp corresponds to the rotation angle position one by one. Thereby, CPU can detect the rotation angle position of the reflection/transmission wheel 2b. The light sources 2 and 3 are on-off controlled according to the image data; and the control is synchronized with the rotation angle position.

Herein, instead of the rotation angle-detecting sensor which incorporates the rotation angle-detecting pattern Sp and the image receptor Sx, a potential meter which a resistance value may change in proportion to the rotational angle may be used as the rotation angle position-detecting sensor. Additionally, an acceleration sensor can be attached to the rotational axis 2m of the reflection/transmission wheel 2b and it can be used for detecting the rotation angle position of the reflection/transmission wheel 2b.

Furthermore, in FIG. 5, for the convenience of description, the rotation angle position of the reflection/transmission wheel 2b is illustrated with an appropriate angle in a clockwise direction provided that the horizontal line is a basic position, 0 degree, while rotating one revolution.

If the spot area 2s is in the transmission area 2q and the light source 2 is turned-on, as aforementioned, the light of the wavelength λA (Blue) transmits the transmission area 2q. If the spot area 2s is in the reflection area 2p and the light source 2 is turned-on, as aforementioned, the light of the wavelength λA (Blue) is reflected by the reflection area 2p.

FIG. 6A illustrates relationship between one image frame and the rotation angle of the reflection/transmission wheel 2b. The relationship between the rotation angle position of the boundary region line $2r_2$ and one image frame (generally referred to as nth frame) is shown, provided that the angle is 0 degree when the boundary region line $2r_2$ is in the horizontal direction.

In Embodiment 2, it is explained that five-color-illumination light is generated as Red (Rn), Green (Gn), Yellow (Yn), Blue (Bn) and Magenta (Mn) color light, during a period of one image frame (for example, TIME=one thirtieth second).

The rotation angle position of the boundary region line $2r_2$ is evenly divided into four periods per 90 degrees, and the last period thereof is further divided equally into two. Accordingly, a period of one frame is divided into 5 in total. The periods are indicated as "a" to "e" for each. During each "a" to "e" period, a light flux of Red (Rn), Green (Gn), Blue (Bn), Yellow (Yn) and Magenta (Mn) is irradiated to the image generator 16.

The rotation angle range of each period "a" to "c" is 90 degrees and that of each "d" and "e" period is 45 degrees. In embodiment 2, if the reflection/transmission wheel 2b rotates in constant velocity, each period of "a" to "c" is one-$120^{th}$ second and each period of "d" and "e" is one-$240^{th}$ second.

Figure 6B:
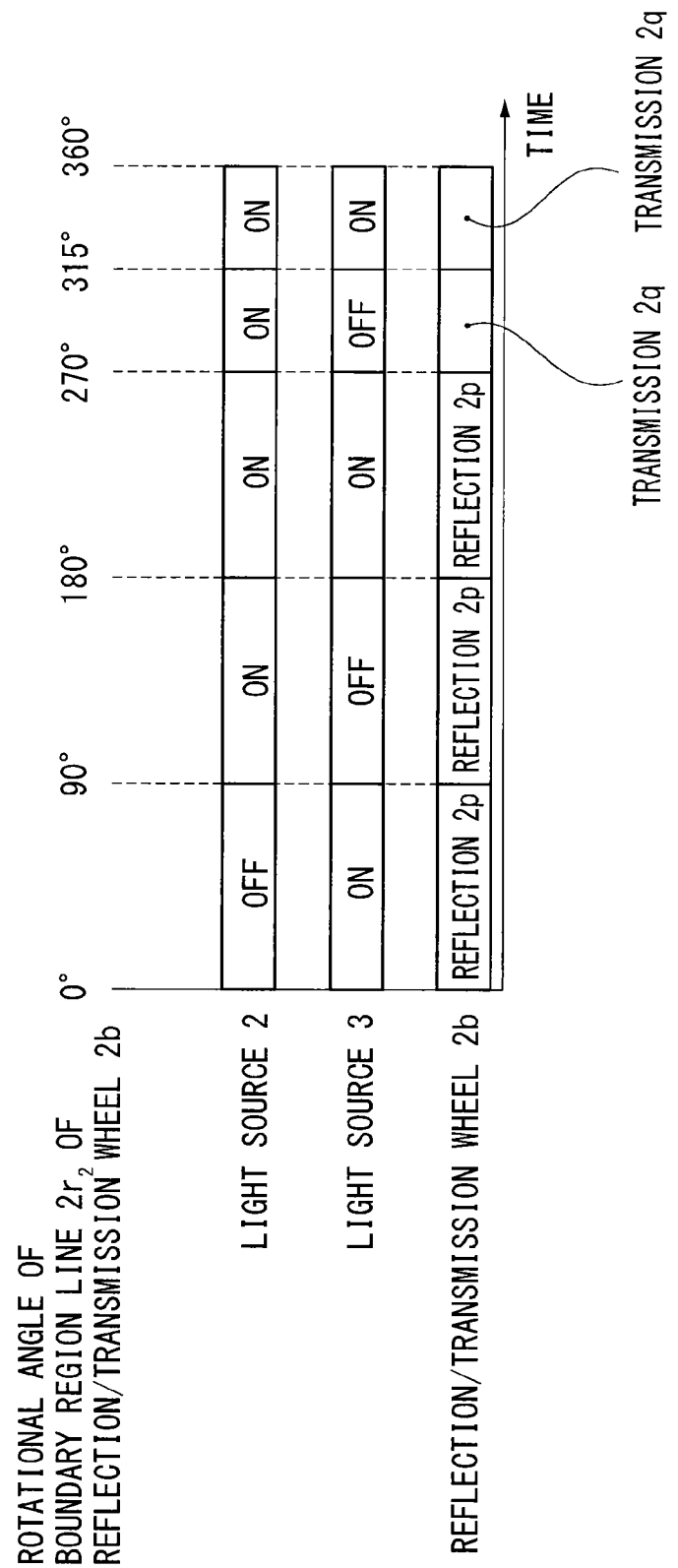

FIG. 6B illustrates the on-off timing of the light sources 2 and 3 and the transmission/reflection timing of the reflection/transmission wheel 2b, according to each period of "a" to "e". In period "a", if the spot area (the emitting light path) 2s is in the reflection area 2p and the light source 2 is turned-off and the light source 3 is turned-on by the controller 11; the red (Rn) illumination light is irradiated to the image generator 16 from the second illumination optical system 1B.

In period "b", if the spot area (emitting light path) 2s is in the reflection area 2p and the light source 2 is turned-on and the light source 3 is turned-off by the controller 11; the phosphor 2h is excited by the light of the wavelength λA from the first illumination optical system 1A, the green (Gn) illumination light is irradiated to the image generator 16.

In period "c", if the spot area (emitting light path) 2s is in the reflection area 2p and both the light sources 2 and 3 are turned-on together by the controller 11; the green and red illumination light is emitted from the illumination optical system 1, therefore yellow (Yn) illumination light irradiates the image generator 16, by the principle of an additive color process.

In period "d", if the spot area (emitting light path) 2s is in the transmission area 2q and the light source 2 is turned-on and the light source 3 is turned-off by the controller 11; the light of the wavelength λA of the first illumination optical system 1A is emitted as the illumination light from the illumination optical system 1, therefore the blue (Bn) illumination light irradiates the image generator 16.

In period "e", if the spot area (emitting light path) 2s is in the transmission area 2q and the light sources 2 and 3 are turned-on together by the controller 11; the blue (Bn) and red (Rn) light is emitted, at the same time, from the illumination optical system 1. Therefore, the magenta (Mn) illumination light irradiates the image generator 16 by the principle of an additive color process.

As described above, according to Embodiment 2, each red, green, blue, yellow and magenta color light can be irradiated to the image generator 16 during each five-divided periods of one frame. By controlling the irradiation timing of each red, green, blue, yellow, magenta color light and two-positional control of each DMD angle; using an after-image phenomenon of the eyes; a full-color image can be generated and the gradation can be controlled at the same time.

Herein, in Embodiment 2, the period of one frame is explained as being divided into five and the rotation angle position of the reflection/transmission wheel 2b corresponds to the five colors, but it is not always limited to the above.

In addition, in Embodiment 2, because the reflecting member is used in the disc-shaped base 2g included in the phosphor wheel 2e, the reflection light path formed by the reflection area 2p of the reflection/transmission wheel 2b can be used together. Therefore, miniaturization of the illumination optical system 1 can be achieved.

Embodiment 3

Figure 7:
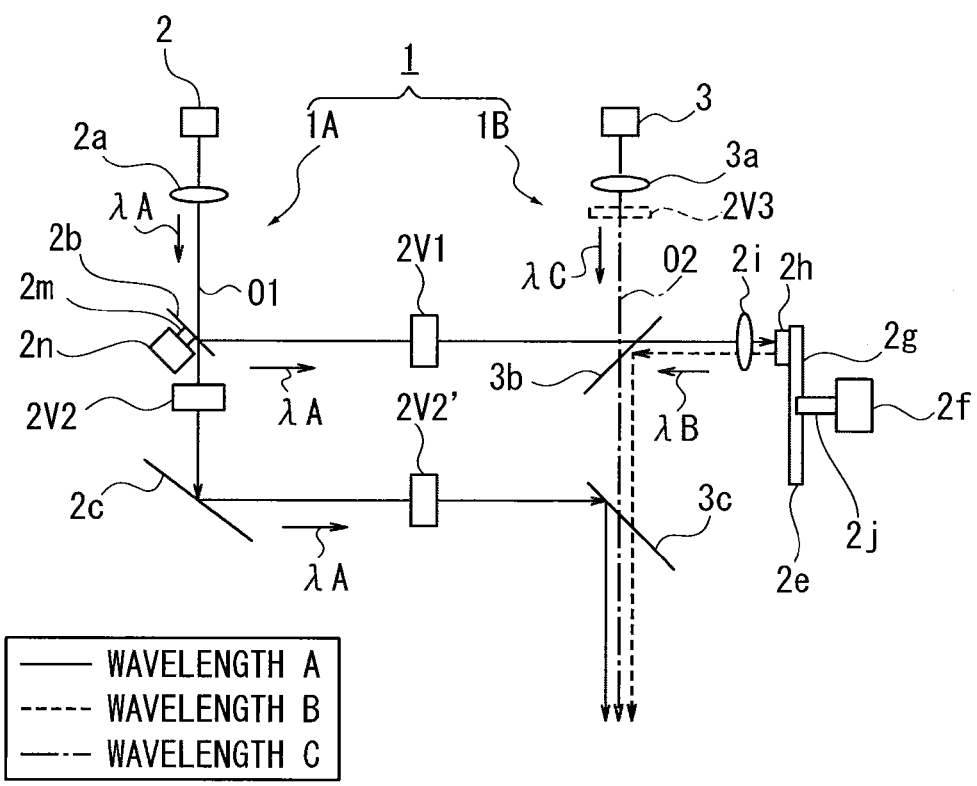
FIG. 7 is an optical view showing an illumination light source device according to Embodiment 3 of the present invention.
Figure 8A:
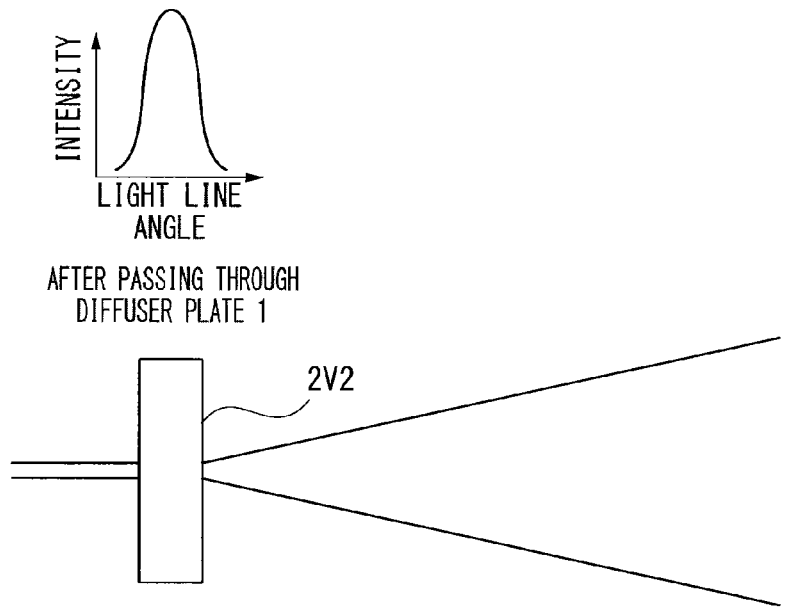
FIG. 8A and FIG. 8B are explanatory views of diffusion of illumination light from the illumination light source device in FIG. 7.
Figure 8B:
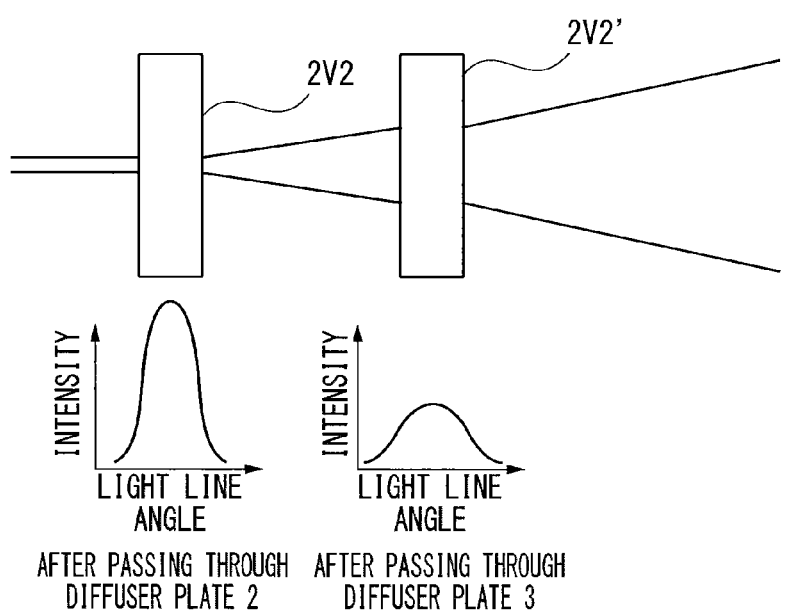

FIG. 7 is an optical view showing an illumination light source device according to Embodiment 3 of the present invention. FIG. 8A and FIG. 8B are explanatory views of the diffusion of the illumination light of the illumination light source device shown in FIG. 7. FIG. 8A shows the diffusion condition of the light when the transmission/diffuser plate is disposed only one in the light path where the light from the first illumination optical system 1A does not pass through the phosphor wheel. FIG. 8B shows the diffusion condition of light from the first illumination optical system when two transmission/diffuser plates are disposed in the light path where the light from the first illumination optical system 1A does not pass through the phosphor wheel.

In Embodiment 3, as shown in FIG. 7, another transmission/diffuser plate 2v2' different from the transmission/diffuser plate 2v2 is disposed in the light path where the light of the wavelength λA from the first illumination optical system 1A does not pass through the phosphor wheel 2e. The second transmission/diffuser plate 2v2 is emitted by a parallel light flux of the wavelength λA as shown in FIG. 8A, when the plate is disposed only one. Then the parallel light flux of the wavelength λA is diffused by the transmission/diffuser plate 2v2 and diffusing light flux having an appropriate intensity distribution can be obtained. The diffusion-angle of the diffusion light flux will be determined according to the refractive property, the thickness, the shape and so on of the transmission/diffuser plate 2v2.

If the transmission/diffuser plate 2v2' different from the transmission/diffuser plate 2v2 is disposed in the light path where the light of the wavelength λA does not pass through the phosphor wheel 2e, the diffusing light flux diffused by the transmission/diffuser plate 2v2 is directed to the transmission/diffuser plate 2v2' and diffused further, as shown in FIG. 8B. The intensity distribution of the diffusion light flux becomes a gentle slope as shown in FIG. 8B, compared with that shown in FIG. 8A. Therefore, the light of the wavelength λA is diffused all the more and the uniformed illumination light can be obtained. The other constitution is similar to Embodiment 1, so the detailed descriptions thereof are omitted here.

Similar to Embodiment 1, if a diffuser plate is disposed in the transmission area 2q of the reflection/transmission wheel 2b, an effect emerges such as the speckle pattern of the laser light emitted from the laser diode can be controlled. Also, similar to Embodiment 1, the transmission/diffuser plate 2v3 can be disposed in the emitting light path of the second illumination optical system 1B as the third transmission/diffuser member as shown in FIG. 1 with a broken line. In this regard, the light of the wavelengths λA, λB and λC can be diffused even. Therefore, the unevenness of the light intensity of illumination light can be avoided.

Embodiment 4

Figure 9:
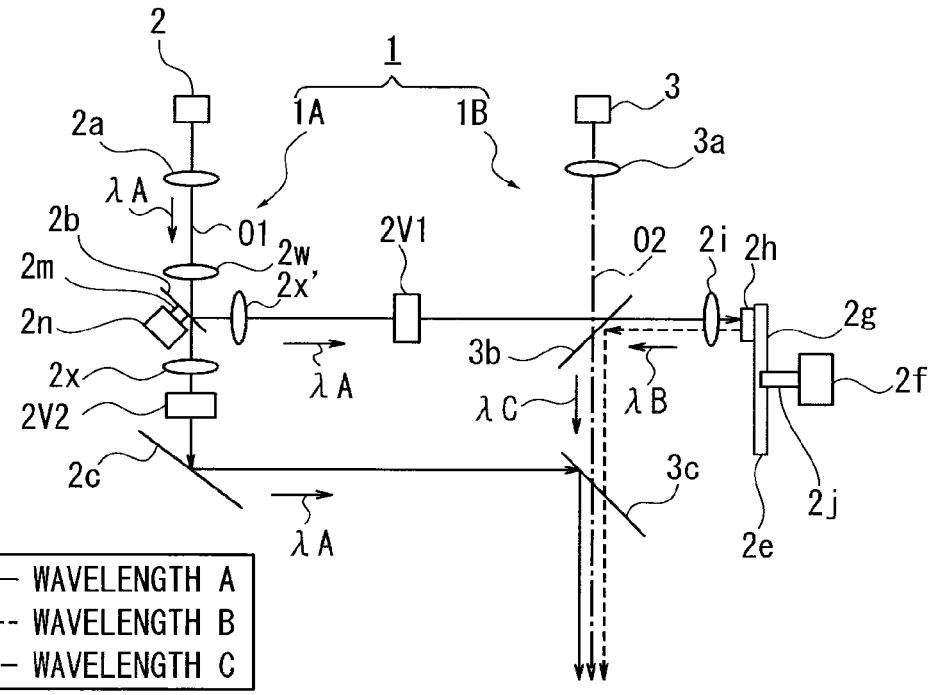
FIG. 9 is an optical view showing an illumination light source device according to Embodiment 4 of the present invention.
Figure 10:
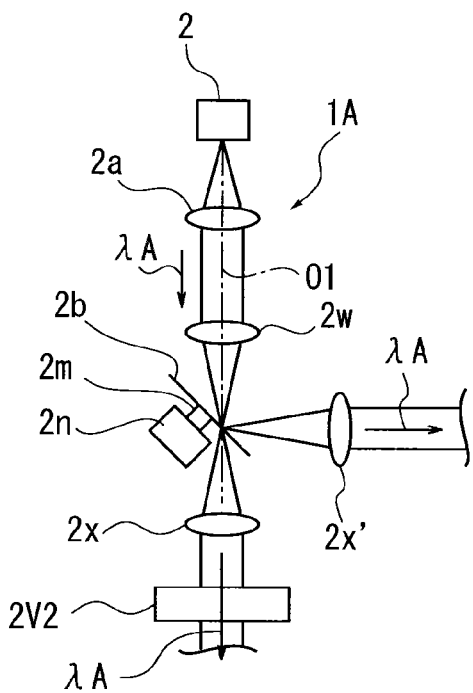
FIG. 10 is a partly enlarged view of the first illumination optical system in FIG. 9.

Embodiment 4 is such that, as shown in FIG. 9 and FIG. 10, the first illumination optical system 1A described in Embodiment 1 further includes a light-condensing element 2w disposed in the emitting light path, a coupling lens 2x disposed in the transmitting light path and a coupling lens 2x' disposed in the reflecting light path. The light-condensing element concentrates the light of the wavelength λA and forms a spotwise area 2s' in the reflection/transmission wheel 2b. The light-condensing element 2w can be driven by a not-shown driving step along with the optical axis 01.

According to Embodiment 4, as shown in FIG. 10, the light of the wavelength λA emitted from the light source 2 is concentrated through the coupling lens 2a, and directed to the light-condensing element 2w as a parallel light flux, then concentrated by the light-condensing element 2w, and finally directed to the reflection/transmission wheel 2b.

When the reflection area 2p is in the emitting light path of the first illumination optical system 1A, the concentrated light of the wavelength λA is reflected through the reflection area 2p and directed to the coupling lens 2x'. Then, it is directed to the transmission/diffuser plate 2v1 as the parallel light flux through the coupling lens 2x', and after being diffused by the transmission/diffuser plate 2v1, it is concentrated through the light-condensing element 2i, and then finally irradiated to the phosphor 2h.

When the transmission area 2q is in the light path of the first illumination optical system 1A, the concentrated light of the wavelength λA transmits the transmission area 2q and is directed to the coupling lens 2x, and further directed to the transmission diffuser plate 2v2 as the parallel light flux through the coupling lens 2x.

Figure 11:
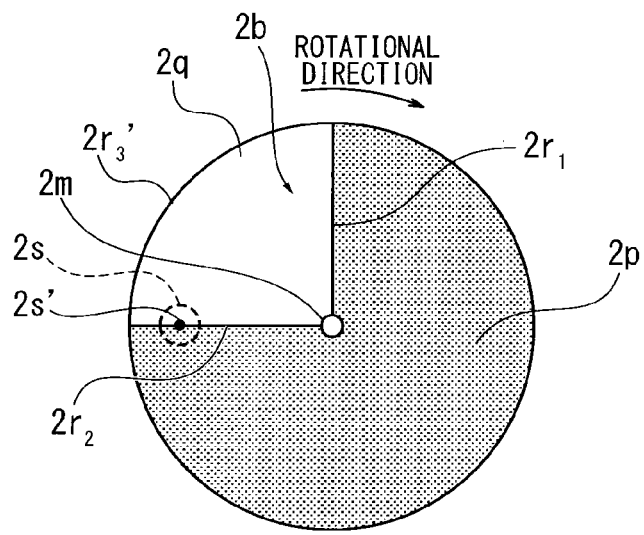
FIG. 11 is an explanatory view illustrates a spot area concentrated by a light-condensing element of the first illumination optical system in FIG. 10.

In Embodiment 4, as shown in FIG. 11, the range of the spot area 2s' can be smaller than that of the spot area 2s of the first illumination optical system 1A in Embodiment 1 because the light flux of the wavelength λA is emitted to the reflection/transmission wheel 2b after being concentrated. Therefore, a time which the boundary region lines $2r_1$ and $2r_2$ between the transmission area 2q and the reflection area 2p of the reflection/transmission wheel 2b crosses the spot area 2s' can be shortened.

When the boundary region lines $2r_1$ and $2r_2$ cross the spot area 2s', a part of the light of the wavelength λA (blue illumination light) transmits the transmission area 2q and a remaining part of light is reflected by the reflection area 2p and directed to the phosphor 2h, thereby the illumination light emitted from the illumination optical system 1 may be mixed color light. It is made possible to improve the color reproducibility (chromatic purity) by reducing the size of the spot area 2s. The detailed description of other structures or functions is omitted since they are similar to Embodiment 1.

Embodiment 5

Figure 12:
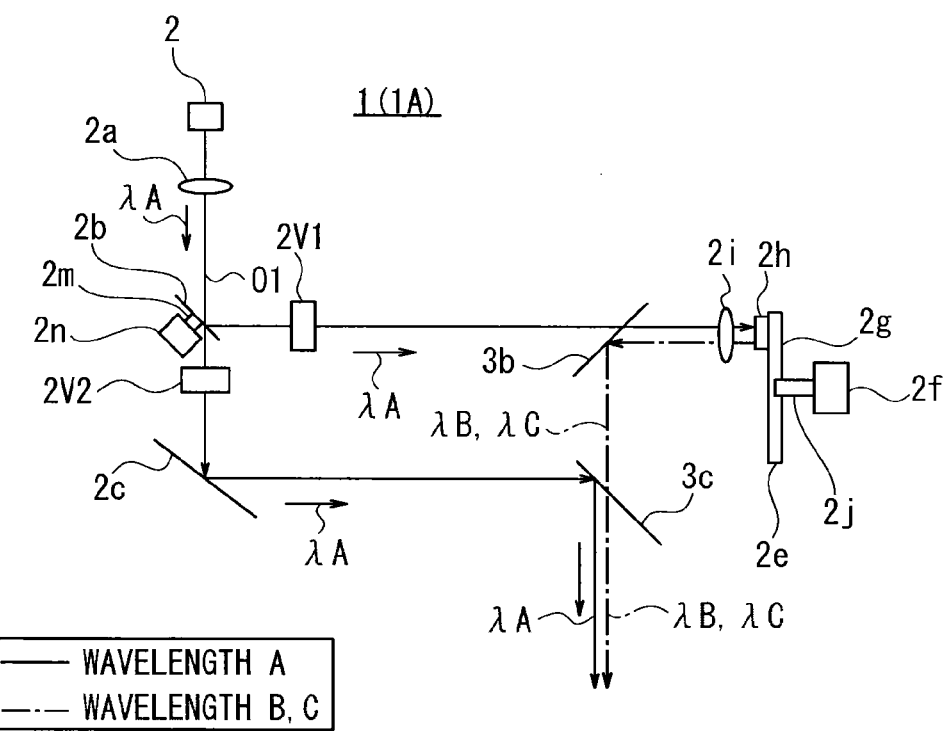
FIG. 12 is an optical view of an illumination light source device according to Embodiment 5 of the present invention.

In Embodiment 5, only one light source is provided in the illumination optical system 1. The light source, similar to Embodiment 1, emits light having the same wavelength as the light of the wavelength λA (Blue) in Embodiment 1. The light source is shown with the numeral 2 in FIG. 12.

Figure 13:
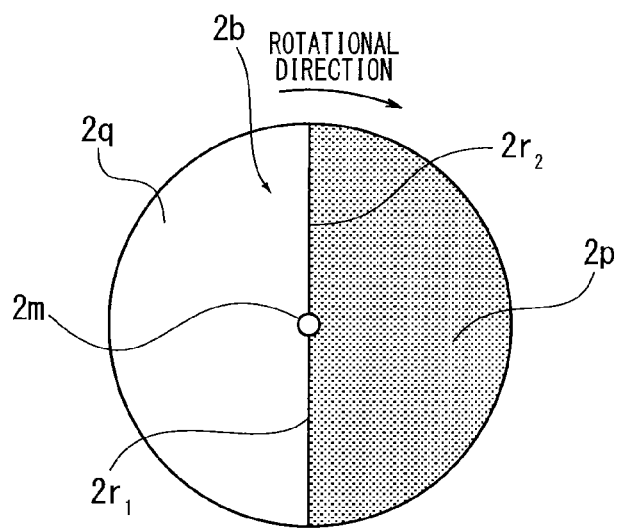
FIG. 13 is a plan view of a reflection/transmission wheel of the illumination light source device in FIG. 12.

As the machinery constitution elements of the reflection/transmission wheel 2b, as shown in FIG. 13, the reflection area 2p and the transmission area 2q are formed at the position symmetry at 180 degrees centering a line crossing the center of the rotation axis 2m. Other constrictions than the above including the total reflection mirror 2c are similar to Embodiment 1, so those elements will be represented with the same numerals and characters as those in FIG. 1.

Figure 14:
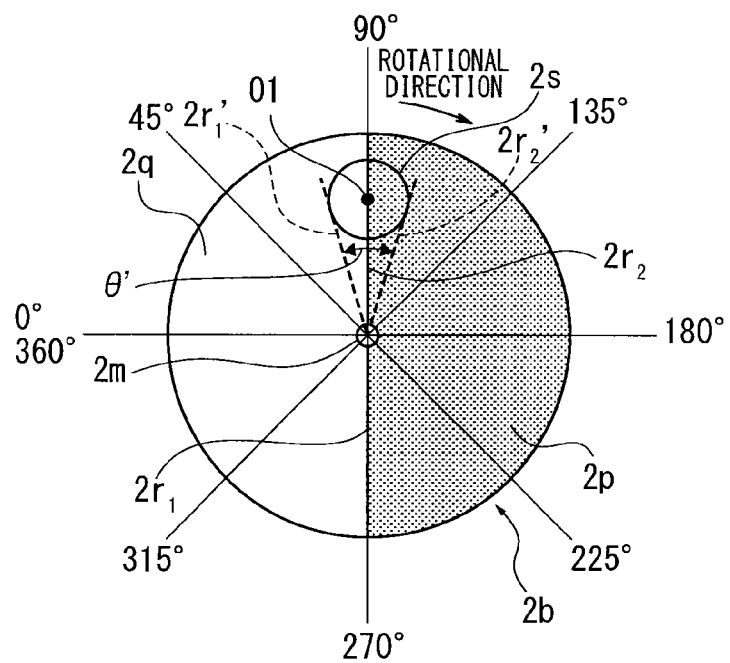
FIG. 14 is an explanatory view illustrates rotation angle position of the reflection/transmission wheel shown in FIG. 13.

In FIG. 13 and FIG. 14, to divide the reflection/transmission wheel into the reflection area 2p and the transmission area 2q, there is a straight center line passing the rotation axis 2m. The straight center line is divided into two lines by the rotation axis 2m in the center. One side of the straight center line is the boundary region line $2r_1$ in radial direction and the other side of the straight center line is the boundary region line $2r_2$ in radial direction. In FIG. 14, the rotation angle position of the boundary region line $2r_1$ in radial direction is shown as the horizontal direction is the basic rotation angle position "0" degree.

Figure 15:
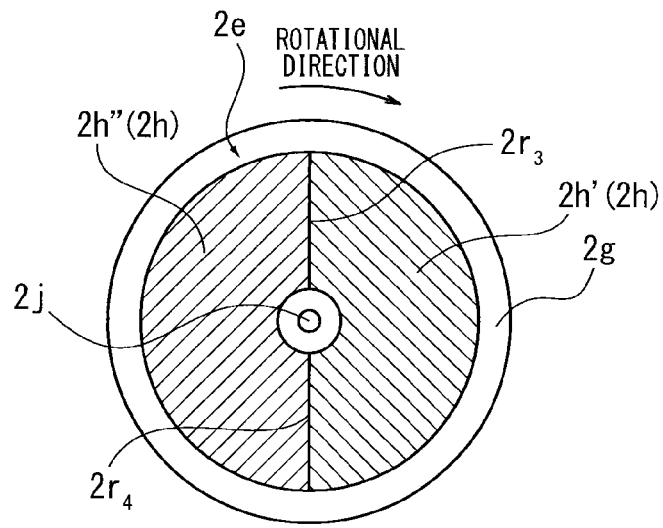
FIG. 15 is a plan view of a phosphor wheel of the illumination light source device in FIG. 12.

As shown in FIG. 15, the annular-shape phosphor 2h of the phosphor wheel 2e includes the semicircular arc phosphor 2h' generating fluorescent light of the wavelength λB (Green) and the semicircular arc phosphor 2h'' generating fluorescent light of the wavelength λC (Red) different from the wavelength λB.

In the Embodiment, the semicircular arc phosphor is formed on the disc-shaped base 2g, and divides the disc by 180 degrees and generates fluorescent light of different wavelength, but it is not always limited to the above.

Figure 16:
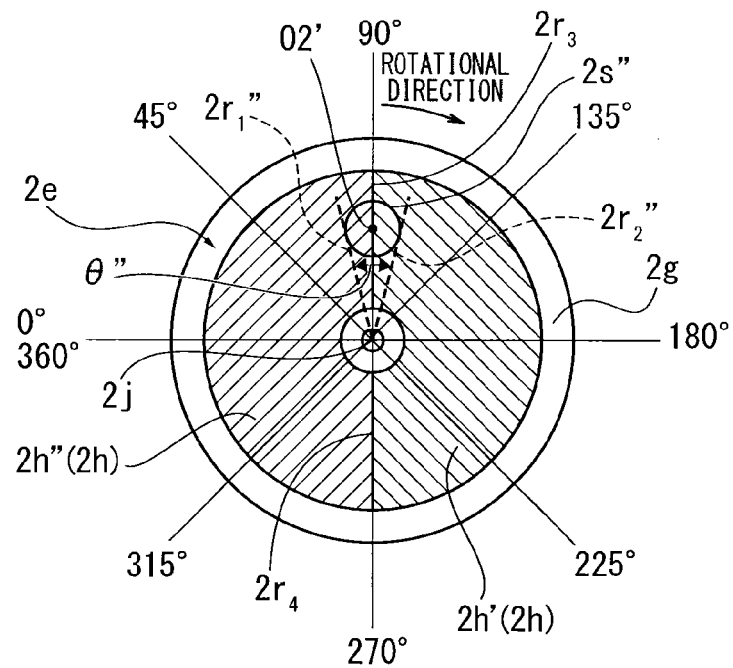
FIG. 16 is an explanatory view which illustrates the rotation angle position of the phosphor wheel shown in FIG. 15.

In FIG. 15 and FIG. 16, there is a straight line indicated as a boundary line between the semicircular arc phosphor 2h' and the semicircular arc phosphor 2h'' in the disc-shaped base 2g. It passes the center of the rotation axis 2j of the disc-shaped base 2g. It is divided into two lines by the rotation axis 2j in the center. One side of the straight line is a boundary region line $2r_3$, and the other side of the straight line is a boundary region line $2r_4$. Furthermore, in FIG. 16, the rotation angle positions of the boundary region line $2r_3$ in radial direction are shown when the horizontal direction is the basic rotation angle position "0" degree.

As shown in FIG. 14, two tangential lines $2r_1'$ and $2r_2'$ extend to radial direction from the center of the rotation axis 2m and touch the outer periphery of the spot area 2s. An angle θ' formed by the two tangential lines may be determined according to the radius of the circle of spot area 2s and the distance between the center of the rotation axis 2m and the center of the spot area 2s (optical axis 01). Hereafter, the description will be given in disregard of the size of spot area 2s.

Similarly, as shown in FIG. 16, two tangential lines $2r_1''$ and $2r_2''$ extend from a center of the rotation axis 2j to radius direction and touch the outer periphery of a spot area 2s'''. The angle θ'' formed by the two tangential lines may be determined according to a radius of a spot area 2s''' and the distance between the center of rotation axis 2j and the center of the spot area 2s'''. Hereinafter, the description will be similarly given in disregard to the size of the spot area 2s'''.

Herein, the phosphor wheel 2e rotates four times during the reflection/transmission wheel 2b rotates once and the angle θ'' is 60 degrees. The rotation angle position of the phosphor wheel 2e corresponds to the position such that the light of the wavelength λA is capable of irradiating the semicircular phosphor 2h' when the boundary region line $2r_3$ is in the range from 0 degree to 90 degrees or when the boundary region line $2r_3$ is in the range of 270 degrees to 360 degrees.

The rotation angle position of the phosphor wheel 2e corresponds to the position where the light of the wavelength λA is capable of irradiating the semicircular arc phosphor 2h'' when the boundary region line $2r_3$ is in the range of 90 degrees to 270 degrees.

Similar to Embodiment 1, the dichroic mirror 3b is provided in the reflecting light path of the reflection/transmission wheel 2b and the dichroic mirror 3c is provided in the transmitting light path. The dichroic mirror 3b functions to transmit the light of the wavelength λA and reflect the light of the wavelength λB and λC. The dichroic mirror 3c functions to reflect the light of the wavelength λA and transmit the light of the wavelengths λB and λC.

The driving part 2f, for example, includes a stepping motor. The disc-shaped base 2g is rotatably-driven centering around the rotation axis 2j on the basis of the prescribed rotational angle positions of the semicircular arc phosphor 2h' and 2h". When the light source 2 is turned-on, the blue light of the wavelength λA is irradiated on the reflection/transmission wheel 2b.

When the transmission area 2q is in the emitting light path of the illumination optical system 1, the blue light of the wavelength λA is directed to the transmission area 2q through the coupling lens 2a as the parallel light flux. The light flux transmits the transmission area 2q and is directed to the transmission/diffuser plate 2v2. After being diffused by the plate, the light flux is reflected through the total reflection mirror 2c and the dichroic mirror 3c, and then it is emitted from the illumination optical system 1.

When the reflection area 2p is in the emitting light path of the illumination optical system 1, the blue light of the wavelength λA is directed to the reflection area 2p as a parallel light flux through the coupling lens 2a. The light flux is reflected through the reflection area 2p and directed to the transmission/diffuser plate 2v1. After being diffused through the plate, the light flux is transmitted through the dichroic mirror 3b and is directed to the light-condensing element 2i, and then it is concentrated through the element and irradiated to the phosphor 2h.

When the blue light of the wavelength λA is concentrated and irradiates the semicircular arc phosphor 2h' of the phosphor 2h, the fluorescent light of the wavelength λB (Green light) is generated using the blue light as the excitation light. When the blue light of the wavelength λA is concentrated and irradiates the semicircular phosphor 2h", the fluorescent light of the wavelength λC (Red light) is generated using the blue light as the excitation light.

The fluorescent light of the wavelength λB or λC is concentrated by the light-condensing element 2i and directed to the dichroic mirror 3b. The light is reflected by the dichroic mirror 3b and is transmitted through the mirror, and then is emitted from the illumination optical system 1.

Examples of the Irradiation Timing to the Image Generator 16

FIG. 17A and FIG. 17B schematically show an example of the relationship between the projection-timing of the RGB light and the rotation angle position of the reflection/transmission wheel 2b and the rotation angle position of the phosphor wheel 2e, in the nth image frame according to Embodiment 5.

The reflection/transmission wheel 2b is described as shown in FIG. 17A that it starts rotating when the rotation angle of the boundary region line $2r_2$ is at 45 degrees to the basic position 0 degree. In contrast, the phosphor wheel 2e starts rotating when the boundary region line $2r_3$ is at the basic position 0 degree.

The following description is based on the light source 2 being turned on when the rotation angle position of the reflection/transmission wheel 2b ranges from 45 degrees to 135 degrees in the nth image frame.

The lighting period of one image frame is separated into four periods of "a", "b", "c", "d", for convenience of description. In period "a", the rotation angle position of the reflection/transmission wheel 2b is controlled by the controller 11 so that the reflection area 2p of the reflection/transmission wheel 2b locates in the emitting light path of the illumination optical system 1. The rotation angle position of the phosphor wheel 2e is also controlled by the controller 11 so that the semicircular arc phosphor 2h' of the phosphor wheel 2e can be irradiated by the light of the wavelength λA.

Thereby, the green (Gn) fluorescent light of the wavelength λB is generated. The green (Gn) fluorescent light is emitted from the illumination optical system 1 through the dichroic mirrors 3b and 3c and irradiates the image generator 16.

In period "b", the rotational angle position of the reflection/transmission wheel 2b is controlled by the controller 11 so that the reflection area of the reflection/transmission wheel 2b locates in the light path of the first illumination optical system 1A. The rotation angle position of the phosphor wheel 2e is also controlled by the controller 11 so that the semicircular arc phosphor 2h" of the phosphor wheel 2e can be irradiated by the light of the wavelength λA.

Thereby, the red (Rn) fluorescent light of the wavelength λC is generated and emitted from the illumination optical system 1 through the dichroic mirrors 3b and 3c and irradiates the image generator 16.

In period c, the rotation angle position of the reflection/transmission wheel 2b is controlled by the controller 11 so that the transmission area 2q of the reflection/transmission wheel 2b can be located in the light path of the first illumination optical system 1A. Thereby, the light of the wavelength λA is transmitted through the transmission area 2q and is reflected by the total reflection mirror 2c and the dichroic mirror 3c, and then is emitted from the illumination optical system 1.

Similarly, in period "d", the rotation angle position of the reflection/transmission wheel 2b is controlled by the controller 11 so that the transmission area 2q can be located in the light path of the first illumination optical system 1A. Thereby, the light of the wavelength λA is transmitted through the transmission area 2q and is reflected by the total reflection mirror 2c and the dichroic mirror 3c, then is emitted from the illumination optical system 1.

In Embodiment 5, each RGB color light can irradiate the image generator 16 by tuning on the light source 2 within the angle range from 45 degrees to 135 degrees of reflection/transmission wheel 2b in a period of one frame. Therefore, it is made possible to form a full-color image as well as to project white color light.

Similar to Embodiment 3, the color tone can be changed. For example, the projected image can be tinged red by setting the period "b" longer. Further, color temperature can be changed by controlling the periods "a", "b", "c" and "d".

Because the similar construction as Embodiment 2 except the optical components of the illumination optical system 1 can be applied to the projector device of this embodiment, the detailed description thereof is omitted.

According to Embodiment 5, since only one light source need be provided, the numbers of optical elements of the illumination optical system 1 can be reduced. Therefore, the illumination optical system 1 can be minimized in size and the cost thereof can be reduced.

In addition, in terms of construction, it is possible for the sizes of the spot areas 2s and 2s" to be decided in the design phase and recorded beforehand in RAM and so on of the controller 11. It is also possible that the basic size of the spot areas 2s and 2s" is decided first, and the changes of the size thereof caused by driving force of the coupling lens 2a in the optical axis direction are calculated by operations. Also, the relationship between the number of rotations of the reflection/transmission wheel 2b and the phosphor wheel 2e can be recorded as a table.

As described above, in the projector device incorporating the illumination light source device, the following steps are carried out: the step of driving the reflection/transmission wheel 2b rotationally; the first diffusion step in which the excitation light is diffused and directed to the phosphor when the emitting light path passes the reflection area 2p of the reflection/transmission wheel 2b (spot area 2s); the second diffusion step in which the light used for illumination of the screen is diffused and directed to the dichroic mirror 3c (a light path-combining element) when the emitting light path passes the transmission area 2q of the reflection/transmission wheel 2b.

In addition, a step of detecting the rotational angle position of the reflection/transmission wheel 2b, and a control step of calculating the timing in which the reflection/transmission wheel 2b crosses the emitting light path using the detection result of the above and controlling the on-off timing of the light source 2 are carried out.

According to the embodiments of the present invention, the light path junction member, which splits the light from the light source into the first light path used for exciting the phosphor and the second light path used for irradiating the screen, is provided. The first diffuser member is disposed in the first light path and the second diffuser member is disposed in the second light path. The first and second diffuser members are arranged in each light path so that the diffusion degree of the second diffuser member is higher than that of the first diffuser member, if their diffusion degrees are compared when the first and the second diffuser members are disposed in an equal distance from the light source.

Therefore, it is made possible to reduce the unevenness of the brightness of the light used for irradiating the screen at the same time as avoiding the degradation of the generation efficiency of the fluorescent light which is generated from the phosphor, when the light from the light source is used by being split into the light path used for excitation of the phosphor and the light path used for irradiating the screen.

Furthermore, the diffusion amount of the light directed to the phosphor member (excitation light) can be lowered than that of the light used for irradiation to the screen (illumination light). The loss of the light intensity of the light which is directed to the phosphor member (excitation light) can be lowered compared with the loss of the light intensity of the light used for irradiating the screen (illumination light).

Although the embodiments of the present invention have been described above, the present invention is not limited thereto. It should be appreciated that variations may be made in the embodiments and the aspects described by persons skilled in the art without departing from the scope of the present invention.

What is claimed is:

1. An illumination light source device, comprising:
    a light path junction member which splits light emitted from a light source into a first light path emitting excitation light for phosphor and a second light path irradiating illumination light, the light path junction member including a reflection/transmission member having a transmission area which transmits light from the light source and a reflection area which reflects light from the light source;
    a light path-combining element which combines the first and the second light paths;
    a first diffuser disposed in the first light path, the first diffuser including a first transmission/diffuser member which transmits and diffuses the excitation light towards a phosphor member; and
    a second diffuser disposed in the second light path, the second diffuser including a second transmission/diffuser member which transmits and diffuses the illumination light towards the light path-combining element, and a diffusion degree larger than that of the first diffuser, wherein
    a first distance between the first transmission/diffuser member and the reflection/transmission member is longer than a second distance between the second transmission/diffuser member and the reflection/transmission member.

2. An illumination light source device according to claim 1, wherein
    a diffusion-angle of the first transmission/diffuser member is smaller than that of the second transmission/diffuser member.

3. An illumination light source device according to claim 1, wherein
    the reflection/transmission member is a wheel, and
    the wheel is rotatably-driven.

4. An illumination light source device according to claim 1, wherein
    the phosphor member includes a phosphor wheel which is rotatably-driven.

5. An illumination light source device according to claim 4, wherein
    the phosphor wheel includes a disc-shaped base having a reflection member;
    the phosphor is formed on the disc-shaped base in a ring-like shape; and
    fluorescent light generated through an excitation light source is reflected by the disc-shaped base and directed to the light path-combining element.

6. A projector using the illumination light source device according to claim 1, comprising:
    an irradiating light system which directs the illumination light emitted from the light path-combining element of the illumination light source device to an image generation part that generates a projection image;
    a projecting light system which projects a projection image generated by the image generation part; and
    a controller which divides a period of one frame of image data and controls the on/off control of the excitation light source in accordance with the image data and the image generation part, the controller being configured to generate the projection image corresponding to the image data using an after-image phenomenon of the eyes.

7. A projector according to claim 6, wherein the image generation part includes a digital micromirror device.

8. An illumination light source device, comprising:
    a phosphor member including phosphor excited by excitation light from an excitation light source which is a part of an illumination optical system;
    a reflection/transmission member disposed in an emitting light path of the excitation light source, the reflection/transmission member having a transmission area which transmits the excitation light from the excitation light source and a reflection area which reflects the excitation light, the reflection/transmission member configured to split the excitation light into a first light path where the excitation light passes through the phosphor member and a second light path where the excitation light does not pass through the phosphor member;

a driving part which drives the reflection/transmission member so that the emitting light path crosses the transmission area and the reflection area alternately;

a light path-combining element which combines the first and second light paths;

a first transmission/diffuser member disposed in the first light path, the first transmission/diffuser member being configured to transmit the excitation light and diffuse the excitation light towards the phosphor member; and a second transmission/diffuser member disposed in the second light path, the second transmission/diffuser member being configured to transmit the excitation light from the excitation light source and diffuses the excitation light towards the light path-combining element, wherein a first distance between the first transmission/diffuser member and the reflection/transmission member is longer than a second distance between the second transmission/diffuser member and the reflection/transmission member, and the illumination optical system is comprised of a first illumination optical system provided in the emitting light path of the excitation light source of the reflection/transmission member and a second illumination optical system having an illumination light source which emits light of different wavelengths than those of the excitation light and the phosphor as illumination light.

9. An illumination light source device according to claim 8, wherein a transmission/diffuser member is disposed in the emitting light path of the illumination light source of the second illumination optical system.

10. An illumination light source device according to claim 8, wherein the first illumination optical system includes an optical element concentrating the excitation light from the excitation light source to form a spot area in the reflection/transmission member, and an optical element is driven towards the optical-axis direction so that a size of the spot area may be controlled.

11. An illumination light source device according to claim 8, wherein the phosphor member includes a rotatably-driven phosphor wheel.

12. An illumination light source device according to claim 11, wherein the phosphor is divided into at least a first semicircular arc phosphor and a second semicircular arc phosphor by a straight line that passes through the rotating center in the rotational direction of the phosphor, and each of the divided phosphors generates different colored fluorescent light to each other by the excitation light.

13. An illumination light source device according to claim 12, wherein the excitation light source is a laser light source which emits a blue laser, the first semicircular arc phosphor has a phosphor member excited by the excitation light and generates green fluorescence, and the second semicircular arc phosphor has a phosphor member excited by the excitation light and generates red fluorescence.

14. An illumination light source device according to claim 12, wherein the illumination optical system includes an optical element which concentrates the excitation light from the excitation light source and forms a spot area on the reflection/transmission member, and the optical element is driven towards an optical-axis direction so that the size of the spot area may be controlled.

15. An illumination light source device according to claim 8, wherein a third transmission/diffuser member is provided in the light path where the excitation light does not pass through the phosphor member.

16. A method of controlling a projector including the illumination light source device according to claim 8, comprising the steps of:

driving the reflection/transmission member of the illumination light source device;

diffusing and directing the excitation light to the phosphor when the emitting light path passes the reflection area of the reflection/transmission member; and diffusing and directing the excitation light to the light path-combining element when the emitting light path passes the transmission area of the reflection/transmission member.

17. A method of controlling a projector according to claim 16, further comprising the steps of:

detecting the position of the reflection/transmission member; and controlling on/off of the light source calculating the timing of the reflection/transmission member crossing the emitting light path based on the detected result.

18. An illumination light source device, comprising:

a phosphor member including phosphor excited by excitation light from an excitation light source which is a part of an illumination optical system;

a reflection/transmission member disposed in an emitting light path of the excitation light source, the reflection/transmission member having a transmission area which transmits the excitation light from the excitation light source and a reflection area which reflects the excitation light, the reflection/transmission member configured to split the excitation light into a first light path where the excitation light passes through the phosphor member and a second light path where the excitation light does not pass through the phosphor member;

a driving part which drives the reflection/transmission member so that the emitting light path crosses the transmission area and the reflection area alternately;

a light path-combining element which combines the first and second light paths;

a first transmission/diffuser member disposed in the first light path, the first transmission/diffuser member being configured to transmit the excitation light and diffuse the excitation light towards the phosphor member; and a second transmission/diffuser member disposed in the second light path, the second transmission/diffuser member being configured to transmit the excitation light from the excitation light source and diffuses the excitation light towards the light path-combining element, wherein a diffusion-angle of the first transmission/diffuser member is smaller than that of the second transmission/diffuser member, a first distance between the first transmission/diffuser member and the reflection/transmission member is longer than a second distance between the second transmission/diffuser member and the reflection/transmission member, and the illumination optical system is comprised of a first illumination optical system provided in the emitting light path of the excitation light source of the reflection/transmission member and a second illumination optical system having an illumination light source which emits light of different wavelengths than those of the excitation light and the phosphor as illumination light.

* * * * *